Nov. 2, 1954          W. J. BERT          2,693,252
GROUND AND TIRE ENGAGING EMERGENCY BRAKE FOR ROAD VEHICLES
Filed Dec. 4, 1953          3 Sheets-Sheet 3
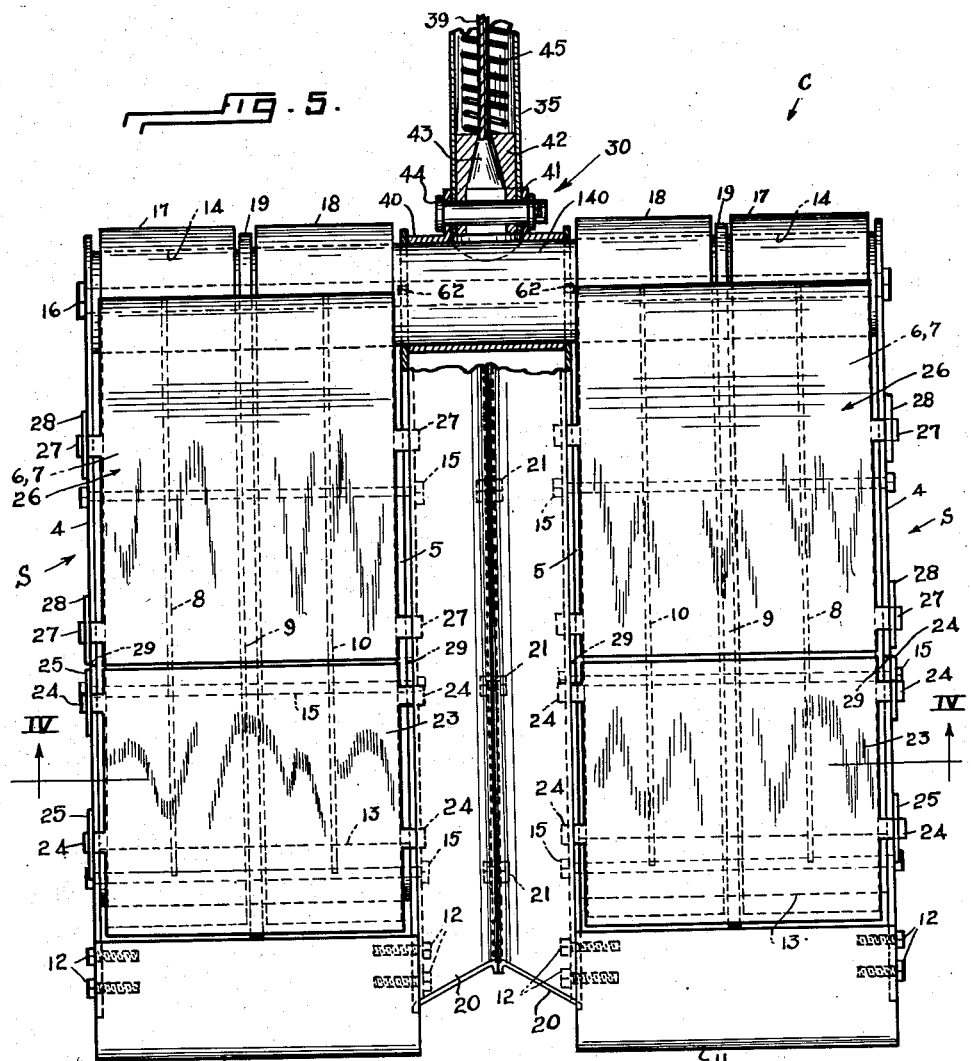
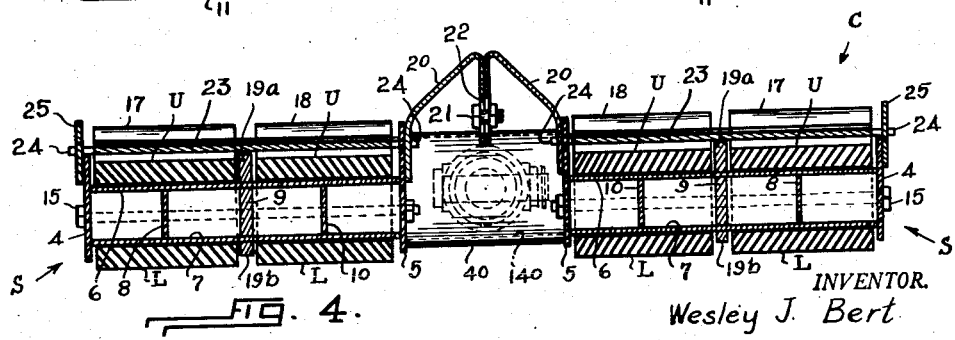
INVENTOR.
Wesley J. Bert
BY

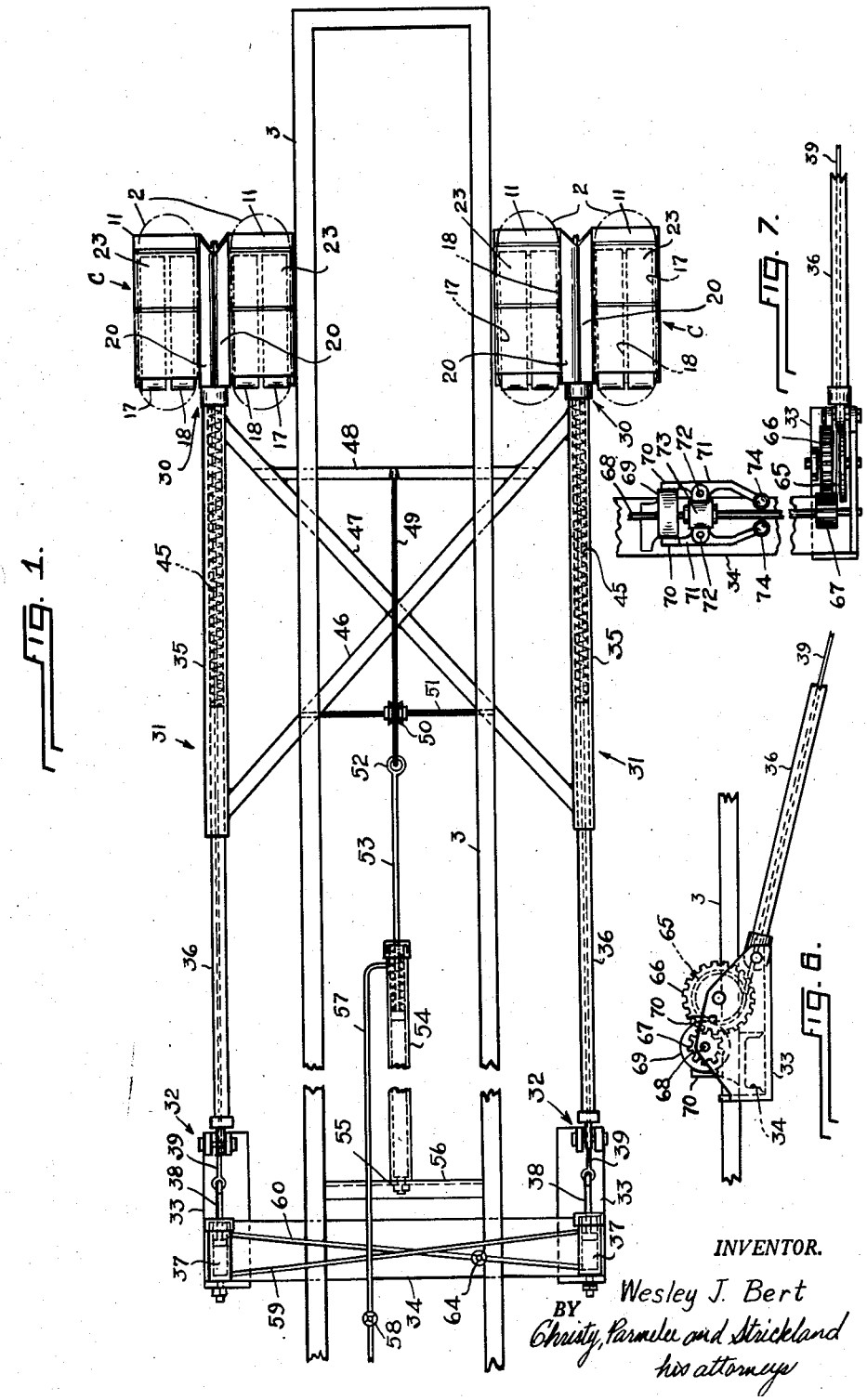

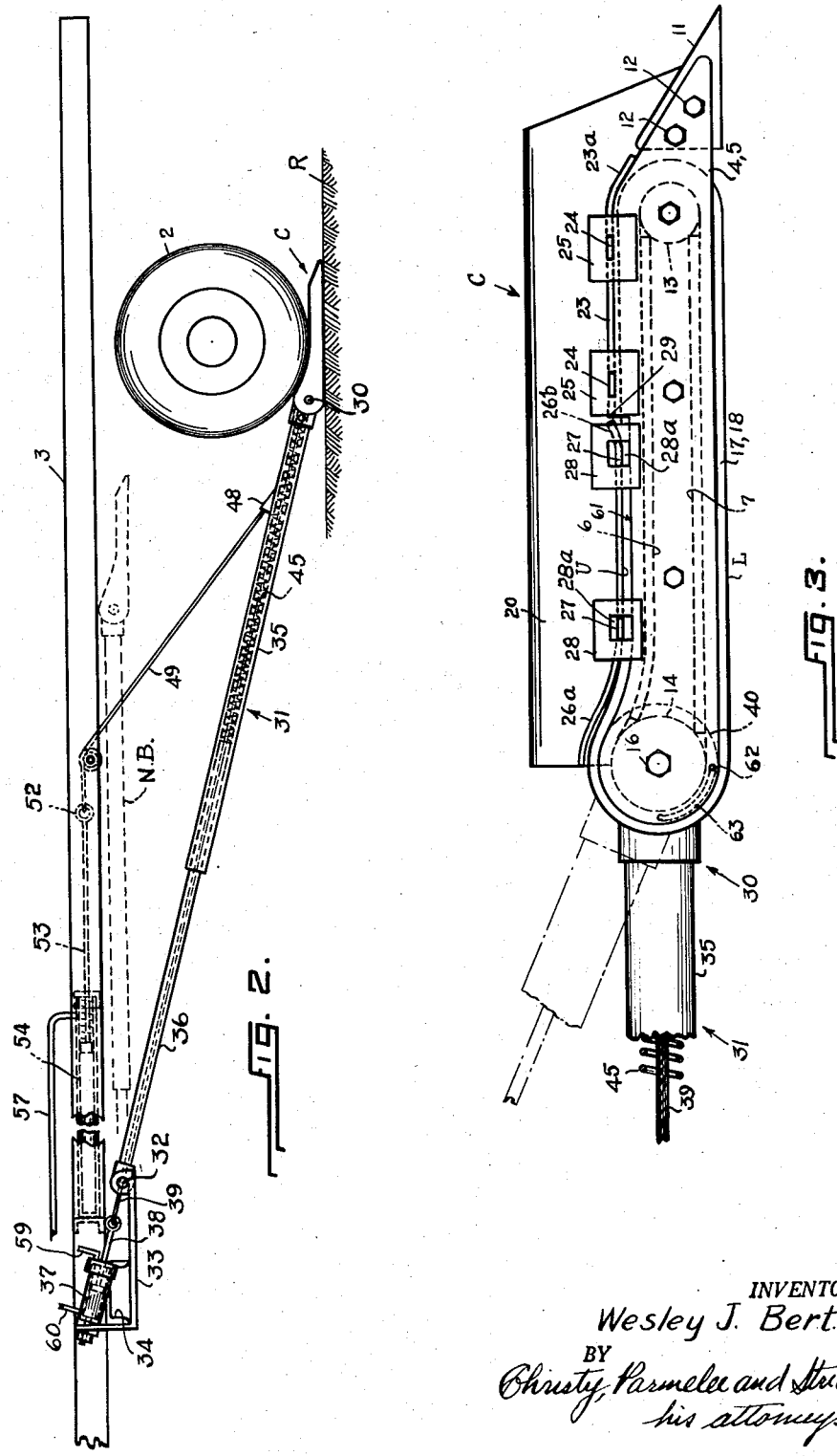

United States Patent Office 2,693,252
Patented Nov. 2, 1954

2,693,252

GROUND AND TIRE ENGAGING EMERGENCY BRAKE FOR ROAD VEHICLES

Wesley J. Bert, Library, Pa.

Application December 4, 1953, Serial No. 396,195

16 Claims. (Cl. 188—4)

My invention relates to trucks, particularly to trailer trucks, and consists in certain new and useful improvements in an emergency brake for such trucks.

In recent years there have been many serious and fatal accidents caused by the failure of the conventional air brakes of trucks, and my prime object is to provide an improved, economical and dependable braking apparatus that may be brought into play when the normal brakes of a truck fail or become less than wholly effective, to the end that accidents may be avoided.

In the case of trailer trucks, which have a tractor with a trailer truck pivotally coupled thereto, there is the danger on slippery roads that, even with sound brakes, the truck may "jack-knife"; that is, when the brakes are applied, the heavily loaded trailer may skid angularly with respect to the tractor and close upon the body of the tractor, after the manner that the blade of a jack-knife closes with respect to its sheath or handle. Jack-knifing trailer trucks cause many accidents involving property damage, personal injury, and traffic tie-ups. A further object of my invention is to provide an auxiliary braking apparatus that may be employed to prevent such dangers in the operation of trailer trucks.

Other objects will appear upon a consideration of the following specification.

In the accompanying drawings, a preferred embodiment of the invention is illustrated, in which:

Fig. 1 is a fragmentary view in plan of the main chassis or frame of a trailer truck body, showing the two sets of rear truck wheels in dot-dash lines, and illustrating the apparatus of the invention;

Fig. 2 is a view in side elevation of the structure shown in Fig. 1;

Fig. 3 is a view in side elevation and to larger scale of one of the chocks of the emergency braking apparatus of the invention;

Fig. 4 is a view in cross section and to still larger scale of the chock shown in Fig. 3;

Fig. 5 is a view in plan of the chock shown in Figs. 3 and 4, and the plane of section of Fig. 4 being indicated at IV—IV in this figure of the drawing;

Fig. 6 is a fragmentary view, showing in end elevation a modified form of the means in the apparatus for gradually releasing the chocks into braking engagement between the truck wheels and the surface of the roadway on which the truck travels; and Fig. 7 is a fragmentary view in plan of the modified means of Fig. 6.

Referring to the drawings, a truck trailer chassis is fragmentarily indicated at 3, and the conventional two sets of rear wheels 2 of the trailer are shown in broken lines in Fig. 1. In this case, each of the sets includes two wheels, but it will be understood that each set may consist of more than two wheels, or each set may consist of a single wheel. In conventional way the trailer chassis is provided with means (not illustrated) at its left-hand end (Figs. 1 and 2) for pivotally coupling the trailer to a tractor, and the wheels 2 are equipped with the usual brakes which are connected to the air-brake system of the truck when the tractor and trailer are coupled for service on the highway. In the drawings, the usual brakes and air-brake system of the tractor and trailer are not illustrated, since such instrumentalities are well known in the art, and it is needless to complicate the drawings with a showing of them. Suffice it to say, that the illustrated emergency brake apparatus, in which my present invention is centered, is adapted to function in those emergencies when the normal air-brake system either fails to function, or functions less than is required for safety.

The auxiliary or emergency brake apparatus of my invention comprises two devices that are mounted, one on each of the opposite sides of the chassis 3, for co-operation one with each set of wheels 2. The device on each side of the chassis comprises a chock C pivotally secured, as at a joint 30, to the distal end of an arm 31. At its proximate end the arm 31 is pivotally secured, as at 32, to a bracket 33 rigidly integrated to the chassis 3 by means of a heavy steel channel 34 welded to the chassis. More particularly, each arm 31 is formed of a distal tube 35 and a proximate tube 36 telescopically assembled. The otherwise free end of the distal tube 35 is pivotally connected (at 30) to a chock C, and the otherwise free end of proximate tube 36 is articulated (at 32) to the trailer chassis 3.

A dash-pot cylinder 37 is mounted, as shown, upon the bracket 33, and within such cylinder a compressed helical spring (not illustrated) is arranged to urge the plunger 38 of the dash-pot towards the left-hand end of the cylinder. A flexible cable 39 is affixed to the outer end of the plunger 38, whence the cable extends through the hollow, telescopically assembled tubes (35, 36) for attachment to the joint (30) in which the chock C is articulated to the telescopic arm (31). In Fig. 5 the chock C will be understood to include a journal portion 140, upon which a bearing 40 is mounted; the bearing includes a socket portion 41 that receives the end of distal tube 35; within such tube a block 42 secures in a lead anchor 43 the end of the flexible cable 39; and a pin 44 extends through the socket portion 41, the tube 35, and the block 42, completing the articulation and union of the parts as described.

A compressed helical spring 45 is arranged in the distal tube 35. The spring bears at one end against the telescoped end of tube 36 and at opposite end against the block 42 at the joint 30. The spring tends to expand and increase the length of the arm 31, and to move the chock into emergency braking position between the wheels 2 and the surface of the roadway on which the trailer truck travels.

As already mentioned a braking device is provided on each side of the chassis 3 for co-operation with the two sets of wheels 2. The distal tubes 35 of the two braking devices are cross connected and rigidly integrated by structural steel members 46, 47 and 48, whereby the various movements of the two arms 31 and chocks C occur in unison. A cable 49 is anchored to the member 48, and is trained over an idler pulley 50 mounted on a shaft 51 which is welded at its opposite ends to the side members of the chassis. Extending beyond the pulley 50 the cable 49 is secured, as at 52, to a plunger 53 of a pneumatic cylinder 54. This cylinder is secured, as at 55, to a rigid beam 56 welded to the side members of the chassis. A pipe 57 connects the cylinder 54 to the compressed air of the air-brake system (not shown) of the truck tractor, and under the air pressure induced through pipe 57 to the pneumatic cylinder the plunger 53 is normally held at the left-hand end of the cylinder, whereby the cable normally holds the arms 31 and their chocks C in the inactive or non-braking position NB illustrated in dotted lines in Fig. 2. When the emergency braking apparatus is thus held in elevated non-braking position, the telescopic arms 31 remain compressed or shortened against the opposing force of springs 45, and in such position the braking apparatus remains so long as the pneumatic pressure of the conventional truck braking system remains at effective value. If for any reason such pressure should drop below effective value, the pneumatic plunger 53 yields to the supported weight of the elevated braking apparatus and moves in left-to-right direction (Fig. 2), allowing the arms 31 to swing downward and to expand, whereby the two chocks C first settle into position upon the surface of the roadway and then move rearwardly into position of engagement between the two sets of wheels 2 and the said surface of the roadway, as shown in full-lines in Fig. 2, with the result that the chocks support the wheels 2 out of contact with the road and co-operate with the road surface in producing an effective drag or braking effect for the trailer truck. In some instances it may be desirable to employ the emergency braking apparatus even though the normal air-brake system of the truck has not become ineffective, and to meet this desideratum a two-way valve 58 is arranged in pipe 57 to vent the cylinder 54 and shut-off the air fed by the air-brake system. The handle of the valve, if not the valve itself, is arranged in the cab of the truck where it is accessible to the driver for instant operation.

It will be understood that the dash-pot plungers 38 normally stand at the left-hand ends of the cylinders 37. When the chocks C are lowered into contact with the roadway and start to enter engaged or braking position between the wheels 2 and the said roadway, the tendency of the wheels 2 is quickly to mount the chocks, with the consequence that, were it not inhibited, the braking effect would be too violent. But here the dash-pots come into play. As the chocks start their entrance into the said engaged or braking position beneath the wheels 2, the cables 39 are drawn taut and arrest the rapid movement of the chocks relatively to the wheels 2 that are mounting them. Then the dash-pot plungers 38, under the tension of the taut cables, gradually move to the right (Figs. 1 and 2), allowing the chocks slowly to enter full braking position beneath the wheels, and thus providing a gradual rather than a violent braking action.

In order to insure that the dash-pots will act with uniform effect on both of the chocks C, the opposite ends of the two cylinders 37 are cross connected by pipes 59 and 60. Such pipes insure that the fluid contained in the dash-pots will react with equalized effect upon the two plungers 38 in restraining the movement of the cables 39, and this restraint upon the cables operates to produce a gradual and slow movement of the chocks into full braking position beneath the wheels 2. Extremely violent braking action is avoided.

When the emergency braking apparatus has brought the trailer truck to a standstill, and the normal air-brake system of the truck has been repaired or restored to full effectiveness, the truck may be backed-up and the wheels 2 removed from mounted position upon the chocks. The restoration of normal air-brake pressure in the pneumatic cylinder 54 is instrumental in moving the plunger 53 in right-to-left direction (Figs. 1 and 2), thereby returning the emergency braking apparatus to its normal elevated or non-braking position represented in dotted lines NB in Fig. 2.

In order further to augment the braking efficiency and dependability of my emergency apparatus in service, the chocks C incorporate certain important features of design, as follows:

Each chock C comprises a frame having a frame section S for each wheel in the two sets of rear wheels 2, and, as shown best in Figs. 3 and 4, each frame section comprises two side plates 4 and 5 of steel secured by bolts 15 laterally against upper and lower cross floor plates 6 and 7. The floor plates are reinforced by and integrated to spaced vertical webs 8, 9 and 10 of plate steel. At one end each frame section S is equipped with a wedge-shaped shoe 11, the shoe being rigidly secured, as by screws 12, to the side plates 4 and 5. Inwardly from the shoe 11 at one end of the frame section a steel cylinder 13 extends between the side plates 4 and 5, while at the opposite end of each frame section a steel cylinder 14 of larger diameter extends between the said side plates. The upper and lower floor plates 6 and 7 are welded at their opposite ends to the cylinders 13 and 14, and it will be noted that, whereas the lower floor plate 7 extends in a horizontal plane, the upper floor plate is upwardly curved to meet in substantial tangency the larger cylinder 14, as appears in Fig. 3. As mentioned, the bolts 15 removably secure the side plates 4 and 5 in assembly with the welded assembly of the cylinder 12 and floor plates 6 and 7 of each frame section. While two separate cylinders 13 are provided for the two frame sections S of each chock, the larger cylinders 14 of the two frame sections are formed integrally of a single round bar or tube, with the result that a journal portion 140 is provided by such bar or tube between the laterally spaced frame sections, as shown in Figs. 4 and 5. A through bolt 16 extends through the cylinder 14 and the outer side plates 4, 4 of the two frame sections.

Each frame section provides a supporting carriage for an endless flexible traction belt of rubber, reinforced with fabric after the manner that the carcass of a pneumatic tire is reinforced. Indeed, each frame section is advantageously provided with two endless belts 17 and 18 that are trained around the cylinders 13 and 14, and extend in upper and lower reaches U and L above and below the floor plates 6 and 7, respectively. The two belts in each frame are separated by a spacer plate 19 (Fig. 5) through which the two cylinders 13 and 14 and the floor plates 6 and 7 extend. The side plates extend marginally outward from the cylinders and floor plates and laterally confine the two belts.

Each of the frame sections S is provided with an elongate steel element 20 of inverted V shape in cross section, welded along one of its two flanges to the side plate 5 of the frame section. The elements 20 extend the length of the two frame sections and are united by bolts 21 extended through slots 22 in the abutting flanges of such elements, as will be understood upon considering Fig. 4. The slots 22 are extended in a vertical direction, to permit relative angular movement of one frame section S with respect to the other, about the axis of the cylinder 14 as a center. By virtue of this angular movement the chock is adapted to adjust itself so that lower reaches L of all four belts may uniformly engage the surface of the roadway. The united elements 20 of the two frame sections of each chock form a ridge, which in the application of the chocks in a braking operation enters between the two wheels 2 of each set of wheels and insures the centering of the wheels with respect to the chocks.

In order further to insure the desired uniform full contact of the lower reaches of the belt 17 and 18 with the surface of the roadway, the lower edges of the side plates 4 and 5 and the lower edge 19b of each of the medial spacer plates 19 extend downwardly from the floor plates 7 by a distance equal to only a fraction of the thickness of the belts, whereby there can be no interference with the engagement of the belts with the roadway over the entire areas of their lower reaches L. The four endless belts in each chock provide a greater area of contact with the roadway than the tires on the wheels with which the chock cooperates during an emergency braking operation. And it may be noted that the outer surfaces of the belts may be formed with treads, as the road-engaging surfaces of pneumatic tires are formed with treads, to increase the desired frictional engagement of the belts with the roadway.

In the foregoing context a description is given of how the dash-pots 37 retard the entrance of the chocks into full braking position between the wheels and the roadway, and thus prevent violent braking effect. It is further important to note that the chocks are of a structure that also prevent sudden or violent braking action, as may be understood by considering the action of the chocks and wheels in a braking operation.

When the chocks of the emergency braking apparatus on a traveling trailer truck are initially lowered into operating engagement with the roadway, the endless bands 17 and 18 begin to revolve or travel in the frame sections S, and then, as the springs in the telescopic arms expand and increase the length of the arms 31, the chocks and their revolving bands move toward engaged position between the wheels 2 and the roadway R (Fig. 2), but the movement of the chocks into such position is restrained by the cables 39 connected to the plungers 38 of the dash-pots, and the rate at which the dash-pots slowly release the cables is adjusted to desired value by means of a valve 64 in the cross connecting line 60, Fig. 1. While the wheels are thus caused gradually to ride upwardly on the wedge-shaped shoes 11, the weight of the truck-bearing wheels is prevented from immediately settling upon the bands; that is, a platform 23 is positioned above the belts in each frame section S, and such platform extends between the adjacent shoe 11 and the points 29 indicated in Figs. 3 and 5. Each platform 23 is supported clear of the upper reaches of the belts, and the support for the platform comprises the top edges of the side plates 4 and 5 and the top edge (19a) of partition plate 19. Securing lugs 24, formed integrally with the two platform plates 23 of each chock, extend through slots in keeper plates 25 that are welded to the outer side plates 4, 4, and through slots in the flanges of members 20 that are welded to the inner side plates 5, 5.

It will be understood, therefore, that the wheels 2, riding upward upon the shoes 11, move into position upon the platforms 23, where their weight is supported above the belts, the right-hand ends 23a of the platforms 23 being curved, as shown in Fig. 3, to facilitate the passage of the wheels from the shoes 11 to the platforms. Thus, the wheels 2 mount the chocks smoothly, and without initially making contact with the belts 17 and 18 that are then revolving under the frictional drag imposed on their lower reaches L by the surface of the roadway. The pressure of the contact of the revolving belts 17 and 18 against the bottom floor plates 7 is increased when the wheels 2 mount the platforms 23 of the chocks, and manifestly such increased pressure increases the resistance to the travel of the belts under the said frictional drag imposed on the lower reaches of the belts by the roadway on which the truck trailer is moving. This resistance to the free travel of the belts produces a gradual braking effect. The dash-dot plungers 38 slowly yield to the tension imposed upon the cables 39 at this time, whereby the chocks gradually reach full braking position; that is, as the wheels 2 mount the supporting platforms 23 the chocks continue slowly to move to the left (Fig. 3) and the wheels pass from the fixed platforms 23 to the "floating" platforms 26.

The platforms 26 have lugs 27 engaged in slots 28a in keeper plates 28 and in the flanges of members 20, but, as distinguished from the slots that secure the lugs 24 of platforms 23, the slots 28a are vertically extended, to permit a vertical movement of the platforms 26. Also, it is to be noted that the top edges of the side plates 4 and 5 and partition plate 19 are recessed downwardly from the points 29 to the left-hand end of each chock. The top edges of such plates lying well below the top surfaces of the upper reaches U of the belts, as indicated at 61 in Fig. 3. Accordingly, when the imposed weight of the wheels 2 passes from the rigid platforms 23 to the floating platforms 26, the latter platforms are depressed into engagement with the top reaches of the belts, with the result that the upper reaches of the revolving belts are forced downwardly against the tops of the upper floor plates 6, thus increasing the resistance to belt travel and increasing the braking effect. The aggregate effect of the friction between the upper and lower reaches of the belts and the floor plates 6 and 7 provides a gradually imposed braking action of the belts against the surface of the roadway, and in a matter of a few seconds the friction of the belts against plates 6 and 7 arrests the travel of the belts entirely, and locks the belts against further travel in the chocks. The travel of the belts being thus gradually arrested, causes the lower reaches L of the belts to react with the desired gradually braking effect against the surface of the roadway. The braking effect is produced quickly, but gradually and efficiently, reducing to a minimum the tendency of the truck or trailer to skid on the roadway.

It will be perceived in Fig. 3 that the platforms 26 are curved upwardly, as at 26b, so that the wheels 2 in moving from the fixed platforms 23 to the floating platforms 26 will not cause the proximate edges of the then depressed platforms 26 to "bite" into the surfaces of the traveling belts. The curved portions 26b of the floating platforms insure that such platforms will frictionally ride the traveling belts. It will also be noted that the floating platforms are curved, as at 26a, to blend with the curvature of the belts 17, 18 in their extent from the horizontal reaches U to the cylinders 14. This particular form of the platform provides cradles between fixed platforms 23 and the curved portions 26a of the floating platforms 26, which cradles conform to the curvature of the tires on the wheels 2.

There is no danger that the wheels 2, in mounting the chocks, will ride entirely over or beyond the chocks, since the dash-pot plungers reach the end of their travel and prevent further movement of the chock-restraining cables 39 when the wheels 2 reach cradled positions upon the floating platforms 26.

In Fig. 3, a chock-supporting arm 31 is fragmentarily indicated in full-lines in the position it occupies relatively to the chock C when the apparatus is supported in elevated, non-braking position NB, Fig. 2. The broken-lines in Fig. 3 serve to illustrate the angular movement of the arm 31 with respect to the chock, as is required when the apparatus is lowered into braking position. In order to restrain or limit the angular movement of the chock with respect to its supporting arm, the bearing 40 of the joint 30 (cf. Figs. 3 and 5) is provided with two pins 62 that extend into arcuate slots 63 formed severally into the side plates 5 of the adjacent frame sections S, Fig. 5. The arcuate extent of the slots 63, concentric with the axis of journal portion 140, determines the permissible angular movement between arm and chock.

If desired, a suitable heavy, heat-resistant lubricant, such as graphite, may be applied between the inner surfaces of the belts 17 and 18 and the surfaces of the plates 6 and 7 which they engage. It will also be understood that flexible belts of other than fabric-reinforced rubber may be used, such, for example, as belts of heavy wire mesh coated with rubber or other suitable plastic material, impregnated with a suitable friction-inducing substance, such as particulate silicon carbide, wood particles, or the like.

Whereas the frame sections S of the chocks comprise belt-supporting members 6, 7, 8, 9, 10, 13 and 14 fabricated of steel plate, it is contemplated that such members may be formed integrally as a casting of aluminum, or other suitable metal. The top and bottom surfaces of such casting will provide, respectively, the equivalent of the upper and lower floor plates or surfaces 6 and 7.

The means for gradually releasing the chocks into braking position beneath the wheels 2 have been shown to consist in hydraulic dash-pots 37, 38. It will be understood, however, that other devices may be used for such purpose. By way of modification, Figs. 6 and 7 illustrate that each cable 39 may at its upper end be secured to and wrapped upon a drum or sheave 65 rotatably mounted in the bracket 33 secured to the chassis 3 by means of the steel channel 34. One of the two circumferential flanges of the drum 65 is formed as a gear 66, with which a pinion 67 meshes. The pinion 67 is fixed upon a rotary shaft 68 that extends across the chassis 3 and carries a second pinion, not shown. The two pinions fixed on shaft 68 mechanically interconnect the drums 65 of the two chock-restraining cables 39. A stationary brake drum 69 is mounted on the fixed cross beam 34, and the rotary shaft 68 extends freely through this brake drum. Two brake shoes 70 are mounted severally upon two arms 71 that are pivoted at points 72 intermediate their lengths to a bearing 73 rigidly secured upon shaft 68. Weights 74 are secured to the ends of the arms opposite to the ends which carry the brake shoes 70. The governing action of this mechanism will be clear to those skilled in the art. That is to say, when the emergency brake apparatus is released from elevated non-braking position, and the arms 31 swing downwardly, gradually increasing in length under the forces of springs 45 as they swing, the cables 39 exert tension that unwinds the cables from the drums; the drums are slowly rotated and through the pinions 67 the shaft 68 is rapidly rotated. The rapid rotation of the shaft 68, and the rotation of the arms 71 with the shaft, bring centrifugal force into play upon the weights 74, with the effect that the weights tend to move away from the axis of rotation—the axis of shaft 68—and to press the brake shoes 70 against the stationary drum 69. The frictional engagement of the shoes 70 against the drum 69 brakes and retards the rotation of the shaft 68 and pinions 67. The so-restrained pinions 67 retard the rotation of the drums 65 that pay-out the cables 39 under the tension of springs 45. Thus, the cables 39 are gradually released by the drums 65, and the chocks C are prevented from moving into braking position beneath the wheels 2 other than in a gradual movement, as described.

It will be understood that the controlled gradual movement of the chocks into position beneath the wheels 2, cooperates with the step-by-step application of friction to the belts 17 and 18 in producing a very efficient emergency braking of the trailer truck.

The apparatus of my invention has been described as it may be applied to a truck trailer, but manifestly the apparatus may be applied to integral trucks as distinguished from trailer trucks, or to buses, or other motor vehicles, and in the appended claims the words "truck trailer" or "truck" will be understood to include the various applications. Furthermore, within the terms of the appended claims many variations and other structural modifications than those described will occur to the mechanic, without departing from the spirit of the invention defined.

I claim:

1. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, each chock comprising a frame supporting an endless flexible traction belt for travel in upper and lower reaches when the lower reach of the belt makes contact with said roadway as it does when the chock enters into engagement between said wheels and roadway, means cross-connecting and uniting the two chock-supporting arms for swinging movement in unison, and means comprising a pneumatic plunger acting under the air pressure of said brake system for securing said arms in their non-braking position, said latter means effecting upon a critical reduction of the air pressure acting on said plunger the downward swinging movement of said arms, whereby the chocks may enter said emergency braking engagement between the roadway and said wheels, with the effect that said wheels depress the upper reaches of the belts of the chocks and lock them in said frame against travel.

2. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, means cross-connecting and uniting the two chock-supporting arms for swinging movement in unison, and means comprising a pneumatic plunger acting under the air-pressure of said brake system for securing said arms in their non-braking position, said latter means effecting upon a critical reduction of the air-pressure acting on said plunger the downward swinging movement of said arms, whereby the chocks may enter said emergency braking engagement between the roadway and said wheels, each of said chocks having a belt mounted for revolving travel therein, said belts having lower reaches positioned for contact with the roadway and upper reaches positioned to be engaged by said wheels severally when the chocks enter said engagement between the surface of the roadway and the wheels.

3. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, means cross-connecting and uniting the two chock-supporting arms for swinging movement in unison, and means comprising a pneumatic plunger acting under the air-pressure of said brake system for securing said arms in their non-braking position, said means effecting upon a critical reduction of the air-pressure acting on said plunger the downward swinging movement of said arms, whereby the chocks may enter said emergency braking engagement between the roadway and said wheels, together with a valve for venting the air-pressure of the brake system acting on said plunger, and means accessible to the truck driver for manipulating said valve, each of said chocks having a belt mounted for revolving travel therein, said belts having lower reaches positioned for contact with the roadway and upper reaches positioned to be engaged by said wheels severally when the chocks enter said engagement between the surface of the roadway and the wheels.

4. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, each of said arms comprising a proximate tube and distal tube telescopically assembled, the distal tube being pivotally secured at its otherwise free end to said chock and the proximate tube being pivotally secured at its otherwise free end to said chassis, a spring arranged in the tube assembly exerting stress to extend or increase the length of said arm, a dash-pot having a cylinder mounted on said chassis, a plunger movable in said cylinder, a flexible cable anchored at one end to the distal tube of said arm and, extending through the telescopic tube assembly, anchored at opposite end to the dash-pot plunger, means cross-connecting and uniting the distal tubes of the two chock-supporting arms for swinging movement of the arms in unison, and means comprising a pneumatic plunger acting under the air-pressure of said brake system for securing said arms in their non-braking position, said latter means effecting upon a critical reduction of the air-pressure acting on said plunger the downward swinging movement of said arms, whereby the chocks may enter said emergency braking engagement between the roadway and said wheels.

5. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, each of said arms comprising a proximate tube and a distal tube telescopically assembled, the distal tube being pivotally secured at its otherwise free end to said chock and the proximate tube being pivotally secured at its otherwise free end to said chassis, a spring arranged in the tube assembly exerting stress to extend or increase the length of said arm, a dash-pot having a cylinder mounted on said chassis, a plunger movable in said cylinder, a flexible cable anchored at one end to the distal tube of said arm and, extending through the telescopic tube assembly, anchored at opposite end to the dash-pot plunger, means cross-connecting and uniting the distal tubes of the two chock-supporting arms for swinging movement of the arms in unison, and means comprising a pneumatic plunger acting under the air-pressure of said brake system for securing said arms in their non-braking position, said latter means effecting upon a critical reduction of the air-pressure acting on said plunger the downward swinging movement of said arms, whereby the chocks may enter said emergency braking engagement between the roadway and said wheels, together with a valve for venting the air-pressure of the brake system acting on said pneumatic plunger, and means accessible to the truck driver for manipulating said valve.

6. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, each chock comprising a frame supporting an endless flexible traction belt for travel in upper and lower reaches when the lower reach of the belt makes contact with said roadway as it does when the chock enters into engagement between said wheels and roadway, each of said arms comprising a proximate tube and a distal tube telescopically assembled, the distal tube being pivotally secured at its otherwise free end to said chock and the proximate tube being pivotally secured at its otherwise free end to said chassis, a spring arranged in the tube assembly exerting stress to extend or increase the length of said arm, a dash-pot having a cylinder mounted on said chassis, a plunger movable in said cylinder, a flexible cable anchored at one end to the lower tube of said arm and, extending through the telescopic tube assembly, anchored at opposite end to the dash-pot plunger, means cross-connecting and uniting the distal tubes of the two chock-supporting arms for swinging movement of the arms in unison, and means comprising a pneumatic plunger acting under the air-pressure of said brake system for securing said arms in their non-braking position, said latter means effecting upon a critical reduction of the air-pressure acting on said plunger the downward swinging movement of said arms, whereby the chocks may enter said emergency braking engagement between the roadway and said wheels.

7. An emergency brake for the two sets of rear wheels of a truck trailer adapted to supplement the air-brake system of the truck, said emergency brake comprising for each set of rear wheels a chock pivotally secured to the distal end of an arm articulated to the trailer chassis to swing between an elevated non-braking position and a lowered emergency braking position in which the chock is engaged between the wheels and the surface of the roadway, each chock comprising a frame supporting an endless flexible traction belt for travel in upper and lower reaches when the lower reach of the belt makes contact with said roadway as it does when the chock enters into engagement between said wheels and roadway, each of said arms comprising a proximate tube and a distal tube telescopically assembled, the distal tube being pivotally secured at its otherwise free end to said chock and the proximate tube being pivotally secured at its otherwise free end to said chassis, a spring arranged in the tube assembly exerting stress to extend or increase the length of said arm, a dash-pot having a cylinder mounted on said chassis, a plunger movable in said cylinder, a flexible cable anchored at one end to the distal tube of said arm and, extending through the telescopic tube assembly, anchored at opposite end to the dash-pot plunger, means cross-connecting and uniting the distal tubes of the two chock-supporting arms for swinging movement in unison, and means comprising a pneumatic plunger acting under the air-pressure of said brake system for securing said arms in their non-braking position, said latter means effecting upon a critical reduction of the air-pressure acting on said plunger the downward swinging movement of said arms, whereby the chocks may enter said emergency braking engagement between the roadway and said wheels, together with a valve for venting the air pressure of the brake system acting on said pneumatic plunger, and means accessible to the truck driver for manipulating said valve.

8. An emergency brake for the two sets of rear wheels of a trailer truck adapted to supplement the air-brake system of the truck, said emergency brake comprising for each of said sets of rear wheels a chock secured to the distal end of an arm articulated to the trailer chassis to swing between an elevated non-braking position and a lowered emergency braking position in which the chock is movable relatively to the point of articulation of the arm to the chassis into engaged position between its set of wheels and the surface of the roadway, means for effecting the movement of the chocks into said engaged position, each of said chocks having a belt mounted for revolving travel therein, said belts having lower reaches positioned for contact with the roadway and upper reaches positioned to be engaged by said wheels severally when the chocks enter said engagement between the surface of the roadway and the wheels, and means for retarding the latter movement of the belt-equipped chocks to inhibit a violent braking action.

9. An emergency brake for the two sets of rear wheels of a trailer truck adapted to supplement the air-brake system of the truck, said emergency brake comprising for each of said sets of rear wheels a chock secured to the distal end of an arm articulated to the trailer chassis to swing between an elevated non-braking position and a lowered emergency braking position in which the chock is movable relatively to the point of articulation of the arm to the chassis into engaged position between the set of wheels and the surface of the roadway, means for effecting the movement of said chock in said engaged position, said chock including a frame having a lower floor surface, an endless flexible band mounted for revolving travel in said frame, said endless band having a lower reach arranged to engage the surface of a roadway and to effect said travel of the band, means for retarding the movement of said chock into engaged position between the set of wheels and the surface of the roadway, and a platform portion on said portion on said chock to receive the set of wheels as it mounts the chock, whereby the lower reach of said belt is frictionally engaged between said lower floor surface and the surface of said roadway to produce a braking effect.

10. The structure of claim 9, said endless flexible band revolving in said frame section having an upper reach exposed to the weight of said set of wheels as the wheels move from said platform portion while the chock is entering fully engaged position between the wheels and the roadway, and an upper floor portion in said frame section beneath said exposed upper reach of the belt, whereby under the weight of the wheels said upper reach of the belt is frictionally engaged upon said upper floor portion, to supplement the braking effect of the engagement of the lower reaches of the belt against said lower floor surface.

11. An emergency braking chock for the wheel of a truck, said chock comprising a frame, an endless flexible band mounted for revolving travel in said frame, said endless band having a lower reach arranged to engage the surface of a roadway and to effect said travel of the band, said endless band also having an upper reach with a portion exposed at the top of the chock, whereby when the truck wheel mounts the chock the band is frictionally locked in the frame against travel, with the result that the lower reach of the band operates against the surface of said roadway with truck-braking effect.

12. An emergency braking chock for the wheel of a truck, said chock comprising a frame section, a pair of endless flexible bands mounted for revolving travel in said frame section, each of said bands having a lower reach arranged to engage the surface of a roadway on which the truck is traveling and thereby effect said travel of the bands, each of said bands also having an upper reach with a portion exposed at the top of said frame section to receive said wheel in mounted position thereon, whereby under the pressure of said wheel said bands are frictionally locked against travel, with the result that the lower reaches of the bands operate against the surface of the roadway with truck-braking effect.

13. An emergency braking chock for the wheel of a truck, said chock comprising a frame section, an endless flexible band mounted for revolving travel in said frame section, a floor plate included in said frame section, said band having a lower reach arranged beneath said floor plate to engage the surface of a roadway on which the truck is traveling and thereby effect said travel of the band, said band having an upper reach above said floor plate with a portion exposed at the top of said frame section to receive said wheel in mounted position thereon, whereby under the pressure of said wheel the upper reach of said band is frictionally locked against said floor plate, with the result that the lower reach of the band operates against the surface of said roadway with truck-braking effect.

14. An emergency braking chock for the wheel of a truck, said chock comprising a frame section, an endless flexible band mounted for revolving travel in said frame section, a floor plate included in said frame section, said band having a lower reach arranged beneath said floor plate to engage the surface of a roadway on which the truck is traveling and thereby effect said travel of the band, said band having an upper reach above said floor plate, a platform arranged above a portion of said upper reach to receive the weight of said wheel, whereby the lower reach of the traveling belt may be pressed in frictional engagement with said floor plate to provide a braking effect, a portion of said upper reach of the belt being exposed to receive the weight of said wheel as it moves from mounted position on said platform, whereby the upper reach of the traveling belt may be pressed in frictional engagement with said floor plate to increase the braking effect first mentioned.

15. The structure of claim 14, wherein said chock comprises two frame sections arranged for pivotal connection to a supporting arm, each frame section having a floor plate, an endless flexible band, and a platform to receive one of two companion truck wheels.

16. The structure of claim 14, wherein said chock comprises two frame sections with the several elements described arranged each to receive one of two companion truck wheels, and means positioned between and rising from said frame sections to enter between the wheels and center them with respect to the chock.

References Cited in the file of this patent

UNITED STATES PATENTS

| Number | Name | Date |
| --- | --- | --- |
| 1,087,553 | Riener | Feb. 17, 1914 |
| 1,310,209 | Ostolaza | July 15, 1919 |
| 1,482,538 | Arnold | Feb. 5, 1924 |
| 1,526,892 | Arrighi | Feb. 17, 1925 |
| 1,554,313 | Warren et al. | Sept. 22, 1925 |
| 2,182,044 | Ackerman | Dec. 5, 1939 |
| 2,658,587 | Velazquez | Nov. 10, 1953 |
| 2,670,817 | Tripp | Mar. 2, 1954 |